United States Patent [19]

Kowallik et al.

[11] 4,254,018
[45] Mar. 3, 1981

[54] LINEAR POLYESTERS CONTAINING PHOSPHONATE HEAT STABILIZERS

[75] Inventors: Jochen Kowallik; Alexander Brandner, both of Heinsberg, Fed. Rep. of Germany

[73] Assignee: Akzona Incorporated, Asheville, N.C.

[21] Appl. No.: 882,097

[22] Filed: Mar. 1, 1978

[30] Foreign Application Priority Data

Mar. 1, 1977 [DE] Fed. Rep. of Germany ....... 2708790

[51] Int. Cl.³ ............................................. C08K 5/53
[52] U.S. Cl. ............................ 260/45.85 R; 260/941; 528/287
[58] Field of Search ................ 260/45.85 R; 528/286, 528/287

[56] References Cited

U.S. PATENT DOCUMENTS

| | | | |
|---|---|---|---|
| 2,652,416 | 9/1953 | Coover, Jr. et al. | 260/941 |
| 2,754,320 | 7/1956 | Johnston | 260/941 |
| 2,963,458 | 12/1960 | Swern | 260/941 |
| 3,196,190 | 7/1965 | Nischk et al. | 260/941 |
| 3,412,070 | 11/1968 | Jakob et al. | 528/287 |
| 3,546,177 | 12/1970 | Kibler et al. | 260/45.7 P |
| 3,649,722 | 3/1972 | Nicholson | 260/941 |
| 3,781,388 | 12/1973 | Jenkner et al. | 260/953 |
| 3,801,542 | 4/1974 | Toy et al. | 260/45.85 R |
| 3,959,213 | 5/1976 | Gilkey et al. | 528/287 |
| 4,058,507 | 11/1977 | Omoto et al. | 528/286 |
| 4,062,829 | 12/1977 | O'Brien | 528/287 |
| 4,086,208 | 4/1978 | Murayama et al. | 260/45.7 P |
| 4,133,800 | 1/1979 | Taubinger et al. | 528/273 |
| 4,169,935 | 10/1979 | Hoheisel et al. | 528/287 |

FOREIGN PATENT DOCUMENTS 49-125494 of 1974 Japan .

*Primary Examiner*—Hosea E. Taylor
*Assistant Examiner*—R. A. White
*Attorney, Agent, or Firm*—Francis W. Young; Jack H. Hall

[57] ABSTRACT

Polyesters containing a freely or chemically incorporated heat stabilizing agent which is a phosphonate of the chemical formula:

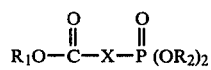

in which $R_1$ and $R_2$ may be identical or different and describe an alkyl radical with 1 to 4 carbon atoms, and in which X represents

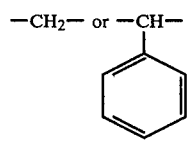

in amounts representing 10 to 400 ppm phosphorus.

12 Claims, No Drawings

LINEAR POLYESTERS CONTAINING PHOSPHONATE HEAT STABILIZERS

This invention relates to linear polyesters, and to a process for their production.

In one of the usual processes for the production of linear polyesters, a dialkylester of an aromatic dicarboxylic acid such as dimethyl terephthalate is first transesterified to the corresponding bis-glycol by reaction with a divalent hydroxyl compound such as ethylene glycol in the presence of an ester interchange catalyst, also referred to here as a transesterification catalyst, and the bis-glycol is then polycondensed in a second stage of the process with the addition of a polycondensation catalyst and a phosphorous compound as heat stabilizer. The purpose of the heat stabilizer is to prevent discoloration of the polycondensation mixture during polycondensation. Although the phosphorous compounds hitherto used, e.g. phosphoric acid, ammonium phosphate or reaction products of triethyl phosphite and glycol, are capable of suppressing the discoloration of the polycondensate to a large extent, they have the serious disadvantage of spontaneously forming coarse, dispersed precipitates with the usual esterification catalysts which block the filter apparatus for the polycondensate, e.g. the screens of the spinning dies.

It is known from German Offenlegungsschrift No. 1,520,534 to use certain phosphonates to prevent both discoloration of the polycondensate and precipitation of sparingly soluble reaction products of the esterification catalyst and heat stabilizer. The phosphonates used are the following compounds:

(a) Compounds corresponding to the following general formula:

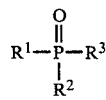

in which one of the groups $R^1$, $R^2$ or $R^3$ is an alkyl, halogenalkyl, hydroxylalkyl, aryl, aryloxy or alkenyl group while the other groups are alkoxy, halogenalkoxy, hydroxyalkoxy, hydroxypolyoxyalkylene, aryl, alkenyl or aryloxy groups;

(b) Compounds corresponding to the following general formula:

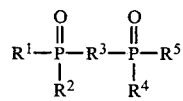

in which $R^3$ represents a divalent organic radical, and at least one radical of each group of radicals (1) $R^1$, $R^2$ and (2) $R^4$, $R^5$ is an alkyl, halogenalkyl, hydroxyalkyl, aryl, alkenyl, halogenalkenyl, hydroxyalkenyl or aryloxy radical while the other radicals are alkoxy, halogenalkoxy, hydroxyalkoxy, aryloxy, aryl, alkenyl, halogenalkenyl or hydroxyalkenyl radicals;

(c) Compounds corresponding to the following general formula:

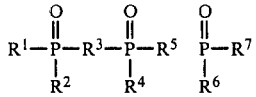

in which $R^3$ and $R^5$ represent divalent organic radicals and at least one radical in each of the groups: (1) $R^1$, $R^2$, (2) $R^4$ and (3) $R^6$, $R^7$ is an alkyl, halogenalkyl, hydroxyalkyl, aryl, aryloxy, or alkenyl group while the other radicals are alkoxy, halogenalkoxy, hydroxyalkoxy, aryl, aryloxy or alkenyl groups;

(d) The products obtained by the reaction of an alkyl phosphite corresponding to the following general formula:

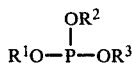

in which $R^1$, $R^2$ and $R^3$ represent alkyl radicals having from 1 to 5 carbon atoms with a compound corresponding to the following general formula:

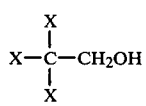

in which X represents a halogen atom or a hydrogen atom;

(e) The product obtained by the reaction of an alkyl phosphonate corresponding to the following general formula:

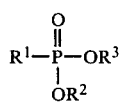

in which the radicals $R^1$, $R^2$ and $R^3$ are alkyl radicals with a polymethylene glycol having from 2 to 10 carbon atoms in the molecule.

The following are examples of phosphonates which are preferred in the known process: bis-[2-bromoethyl-(phenyl)]-ethylenediphosphonate; bis-(hydroxypolyoxyethylene)hydroxymethylphosphonate; the reaction product of triethylphosphite and 2-chloroethanol; the reaction product of triethylphosphite and 2-bromoethanol; and bis-(2-chloroethyl)-1-[(2-chloroethyl)-1-]-(2-chloroethyl)-2-chloroethylphosphonate-[-ethylphosphonate]-ethylphosphonate.

The phosphonates used in this known process are capable or reducing the discoloration of the polycondensate to only a certain extent. Although the polycondensates obtained by this process are suitable for the manufacture of foils and sheets which are not required to meet high standards of whiteness, they are not suitable for the manufacture of chemical fibers in which much higher degrees of whiteness are required.

According to German Pat. No. 1,520,079, in the production of high polymer polymethylene terephthalates from a dialkylester of terephthalic acid with a glycol in the presence of an alkaline earth metal compound, the polycondensation after ester interchange is carried out in the presence of a polycondensation catalyst and of a carboxyl group-containing phosphinic or phosphonic acid acid corresponding to the following general formula:

$$(RO)_n-P{-[}A-(COOR)_x]_m$$

in which A represents an unspecified aliphatic, alicylcic or heterocyclic radical, preferably an aromatic radical, R represents hydrogen, or alkyl, x and n=1 or 2 and m=3−n. The purpose of the phosphorus compound is to bind the alkaline earth metals, which tend to precipitate from the polymer mass, in the form of a salt of the phosphorous compound which will be soluble in the polyester. It is preferable to use compounds which have two carboxylate groups (x=2) so that the resulting salt can be completely built into the polymer chain. In this known process, the ester interchange catalysts which contain alkaline earth metals are used in quantities corresponding to at least 0.1 mol percent of alkaline earth metal. Since the phosphorous compounds are used in at least the quantity required for converting the alkaline earth metal salt into the desired salt of phosphinic or phosphonic acid, they must be used in large quantities, based on the quantity of polyester, for example, 1050 ppm in the case of p-carboxylbenzene phosphonic or phosphinic acids. According to the present invention, on the other hand, the stabilizers are used in quantities of only 10 to 400 ppm, preferably 30 to 150 ppm, again based on the quantity of polyester. Moreover, the polyesters obtained when p-carboxybenzene-phosphonic acid is used are cloudy.

According to published Japanese Patent Application No. 49-125494, carbalkoxyethane phosphonic acid esters, for example, dimethyl-2-carbomethoxy-; diethyl-2-carboethoxy-; dipropyl-2-carbopropoxy- and dibutyl-2-carbobutoxy-ethyl phosphonate are used as heat stabilizers for polyesters. The aforesaid compounds are obtainable by Michael Addition of α, β-unsaturated carbonyl compounds to diesters of phosphoric acid, and since the reaction by which they are obtained is reversible, they may decompose back to their starting materials. The decomposition products have a damaging effect on the properties of the polymer, in particular, they cause undesirable yellowing of the polyester. This also applies to the corresponding propane- and butane- phosphonic acid derivatives. Moreover, polyesters which have been produced using ethane-, propane- or butane-phosphonic acid esters perform badly in the pressure build-up test, i.e. they show bad distribution of pigment, e.g. titanium dioxide, and of the transesterification catalysts.

It is an object of the present invention to provide new phosphorous compounds as heat stabilizers, which will not have the disadvantages mentioned above, and by means of which it will be possible to produce linear polyesters with a high degree of whiteness without the difficulties in operation described above.

The invention relates to linear homo- or copolyesters of one or more dicarboxylic acids and one or more dihydroxy compounds, which contain, as heat stabilizers, a phosphonate corresponding to the following general formula:

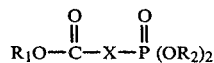

in which $R_1$ and $R_2$ may be the same or different and represent an alkyl radical having from 1 to 4 carbon atoms and X represents —$CH_2$— or

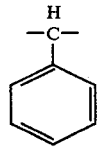

in quantities corresponding to from 10 to 400 ppm of phosphorous, based on the polyester, in a free and/or chemically bound form.

The polyesters should be understood to be homopolyesters or copolyesters, in particular those having from 2 to 20 carbon atoms in the acid component and from 2 to 15 carbon atoms in the dihydroxy component. Examples of such polyesters include those which may be prepared from one or more of the following saturated aliphatic, aromatic or cycloaliphatic dicarboxylic acids or their ester forming derivatives and one or more divalent aliphatic, alicyclic, aromatic or araliphatic alcohols or a bisphenol. The following are examples: adipic acid; pimelic acid; suberic acid; azelaic acid; sebacic acid; nonane-dicarboxylic acid; decane-dicarboxylic acid; undecane-dicarboxylic acid; terephthalic acid; isophthalic acid; alkyl-substituted or halogenated terephthalic and isophthalic acids; nitroterephthalic acid; 4,4'-diphenyl-ether-dicarboxylic acid; 4,4'-diphenylthioether-dicarboxylic acid; 4,4'-diphenyl-sulphone-dicarboxylic acid; 4,4'-diphenyl-alkylene-dicarboxylic acid; naphthalene-2,6-dicarboxylic acid; napthalene-2,7-dicarboxylic acid; napthalene-1,5-dicarboxylic acid; cyclohexane-1,4-dicarboxylic acid and cyclohexane-1,3-dicarboxylic acid.

The following are typical examples of diols or phenols suitable for the preparation of these homo- and copolyesters; ethylene glycol; diethylene glycol; propane-1,3-diol; butane-1,4-diol; hexane-1,6-diol; octane-1,8-diol; decane-1,10-diol; propane-1,2-diol; 2,2-dimethyl-propane-1,3-diol; 2,2,4-trimethylhexanediol; p-xylenediol; cyclohexane-1,4-diol; cyclohexane-1,4-dimethanol and bisphenol A. The usual products which are reinforced with glass fibers or asbestos, carbon or graphite fibers are also to be included among the suitable polyesters.

Examples of stabilizers which may be used according to the invention include the dimethyl-, diethyl-, dipropyl- and dibutyl esters of the following phosphonic acids: carbomethoxymethane-phosphonic acid; carboethoxymethane-phosphonic acid; carbopropoxymethane-phosphonic acid; carbobutoxymethane-phosphonic acid; carbomethoxy-phosphono-phenyl acetic acid; carboethoxy-phosphono-phenyl acetic acid; carbopropoxy-phosphonophenyl acetic acid and carbobutoxy-phosphono-phenyl acetic acid.

The phosphonic acid dialkyl esters to be used as heat stabilizers according to this invention are readily available compounsds and may be synthesized from phosphonic acid dihalides, phosphonic acid ester halides, orthophophonic acid tetrahalides, esters of phosphorous acid or phosphonic acid diester halides by the known processes described in Houben-Weyl, Methoden der Organischen Chemie, 3rd Edition (1963), Georg-Thieme Verlag Stuttgart, Volume XII/1, pages 423 et seq. On a commercial scale, these compounds may be prepared from an alkyl ester of phosphorous acid having from 1 to 4 carbon atoms in the alkyl radical, e.g. the dimethyl, diethyl, dipropyl, dibutyl or diisobutyl ester of phosphorous acid and an ester of monochloro acetic acid, β-chloropropionic acid, α-chlorobutyric acid, chlorosuccinic acid, β-chlorovaleric acid or phenylchloroacetic acid by Michaelis-Arbusov's or related reaction, in particular by a Michaelis-Becker reaction from phosphorous acid diesters and one of the above mentioned halogenated carboxylic acid esters (Houben-Weyl, l.c. page 446). The following literature references are also given for the preparation and properties of the phosphonic acid dialkyl esters to be used according to the invention:

(a) for the Michaelis-Becker reaction: M. Kosolapoff, J. Am. Chem. Soc. 68, 1103 (1964); A. J. Speziale, J. Org. Chem. 23, 1883 (1958; P. Nylen, B. 57, 1023 (1924) and 59, 1119 (1926); B. Arbusov, C. A. 42, 6315 (1948) and 45, 7002 (1951).

(b) for the Michealis-Arbusov reaction: H. W. Coover, J. Am. Chem. Soc. 79, 1963 (1957); P. Nylen, B. 57, 1023 (1924); B. Arbusov, C. 1914, I, 2156 and B. 60, 291 (1927); G. Kamai, C. A. 45, 542 (1951); P. Ackermann, J. Am. Chem. Soc. 79, 6524 (1957).

The polyesters according to the invention contain the phosphonic acid esters in the usual quantity for heat stabilizers which correspond to from 10 to 400 ppm, preferably from 30 to 150 ppm of phosphorous, based on the polyester. They are distributed free and/or in a chemically bound form in the polyester, but it is to be assumed that the chemically bound form predominates, particularly if the size of the phosphonic molecule corresponds to that of the polyester structural unit.

Since the heat stabilizer is chemically bound to the polyester molecule in the polyesters according to the invention, the major proportion of the transesterification catalyst is also chemically bound to the polyester molecule, so that precipitation of the transesterification catalyst cannot occur. The fact that no significant amount of deposition is now found on the screens of the spinning nozzles used for processing the polyesters according to the invention and that no change in the composition occurs even after several hours extraction of the polymer shavings also indicates that the heat stabilizer and transesterification catalyst are chemically fixed.

The invention also relates to a process for the preparation of linear homopolyesters and copolyesters by the reaction of one or more saturated aliphatic, aromatic or cycloaliphatic dicarboxylic acids or their ester forming derivatives with one or more aliphatic, alicyclic, aromatic or aralphatic dihydroxy compounds in the presence of a transesterification catalyst, followed by polycondensation of the bis-ester in the presence of a polycondensation catalyst and a heat stabilizer. The process is characterized in that the heat stabilizer used is a phosphonate corresponding to the following general formula:

$$R_1O-\overset{O}{\overset{\|}{C}}-X-\overset{O}{\overset{\|}{P}}(OR_2)_2$$

in which $R_1$ and $R_2$ may be the same or different and represent an alkyl radical having from 1 to 4 carbon atoms and X represents $CH_2$ or

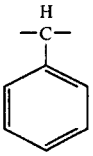

The heat stabilizers are preferably used in quantities corresponding to from 10 to 400 ppm of phosphorus, in particular from 30 to 150 ppm of phosphorus, based on the polyester.

The transesterification and polycondensation catalysts used are the compounds or mixtures generally used for this purpose. Suitable transesterification catalysts include manganese acetate, zinc acetate, cobalt acetate, calcium acetate, magnesium acetate and zirconium acetate. Examples of suitable polycondensation catalysts include antimony oxide, germanium oxide, titanium methylate and other conventional titanium catalysts. The transesterification catalysts used are preferably zinc acetate, manganese acetate or mixtures of these two compounds while the polycondensation catalysts are preferably antimony oxide, germanium oxide or a mixture of these two. The quantities of transesterification and polycondensation catalysts used lies within the usual range of from 50 to 400 ppm, based on the polyester.

Polycondensation is carried out under the usual pressure, temperature and other conditions. Using the heat stabilizer according to the invention therefore requires no modification of the usual process conditions and transesterification and polycondensation apparatus.

The linear polyesters according to the invention may be processed into the usual shaped products such as sheets, films, plates or injection molded articles. They are particularly suitable for processing into fibers. Another object of this invention is therefore the use of the polyesters for the manufacture of fibers. Fibers of polyesters of terephthalic acid, especially of polyethylene terephthalate, are particularly important for this purpose.

The heat stabilizers used according to the invention are distinguished by numerous valuable properties. They have a high thermal stability and therefore do not tend to undergo cracking reactions. They are also distinguished by low volatility and consequently even those portions of the stabilizer which are not chemically bound are firmly retained in the polyester. They are chemically uniform and therefore easy to handle in manufacturing processes. Since they are non-ionic compounds, they are inert towards titanium dioxide and other polyester additives, and are not corrosive. The main advantage of the heat stabilizers according to the invention, however, is that they prevent the formation of deposits in the filtering apparatus and on the spinning die, so that the dies can be kept in continuous operation for much longer. In addition, the phosphonate-containing polyesters according to the invention are distinguished by visually advantageous properties (high degree of remission). The aforesaid advantage are not achieved with the known acid heat stabilizers such as phosphoric acid or reaction products of phosphorus pentoxide and ethylene glycol.

EXAMPLES 1–14

Dimethyl terephthalate and ethylene glycol were mixed together at 150° C. in a molar ratio of 1:2.1. The transesterification catalyst or catalysts was or were then added and the transesterification reaction was started by raising the temperature gradually. It was raised to 220° C. in the course of a further 1.5 hours and, at the end of this time, the transesterification reaction was completed. Excess glycol was then distilled off while the temperature continued to be raised. The phosphonate heat stabilizer to be used according to the invention was added at 235° C. and a titanium dioxide dispersion at 240° C. Polycondensation catalysts $Sb_2O_3$ and $GeO_2$ were added at 250° C. Polycondensation was continued under continued increase of the temperature to 290° C. and progressively increasing vacuum (final vacuum 0.66 mbar) and was completed after about 2.5 hours. The melt was then extruded, cooled and broken down into small pieces.

The catalysts used, their quantity based on dimethyl terephthalate (DMT), the heat stabilizers used, their quantity based on DMT, and various properties of the polycondensates obtained are summarized in the following tables. For comparison purposes, a reaction product (GPA) of triethyl phosphate and ethylene glycol, free phosphoric acid or, according to German Offenlegungsschrift No. 1,520,534, hydroxymethyl phosphonic acid diethyl ester (HPE), or carbomethoxyethane-phosphonic acid dimethyl ester (MEPM) according to Japanese published application 49-125494 or the homologous compounds, carbomethoxypropane- and carbomethoxybutane-phosphonic acid dimethyl ester (MPPM and MBPM, respectively) were used in Examples 1, 2, 4, 12, 13 and 14.

The following abbreviations are used in the tables:
DMT: Dimethyl terephthalate
SV: Solution viscosity, determined in cresol
DEG: Diethylene glycol ether content
RG: Degree of remission
GPA: Reaction product of triethyl phosphate and ethylene glycol
PEE: Carboethoxy-methane-phosphonic acid diethyl ester
HPE: Hydroxymethylene-phosphonic acid diethyl ester
MEPM: Carbomethoxyethane-phosphonic acid dimethyl ester
MPPM: Carbomethoxypropane-phosphonic acid dimethyl ester
MBPM: Carbomethoxybutane-phosphonic acid dimethyl ester
CEPP: Carboethoxy-phosphono-phenyl acetic acid

| Example No. | Transesterification or polycondensation catalyst in ppm (based on DMT) | Heat stabilizer | Quantity of heat stabilizer in ppm (based on DMT) | SV | DEG | RG | COOH end groups magu/kg | Pressure build-up test in minutes |
|---|---|---|---|---|---|---|---|---|
| 1 (Comparison Example) | 150; $Mn(Ac)_2 \cdot 4H_2O$ 100; $Zn(Ac)_2 \cdot 2H_2O$ 250; $So_2O_3$ 100; $GeO_2$ | GPA | 50 | 1.635 | 1.1 | 83 | 34 | 153 |
| 2 (Comparison) | Same as No. 1 | $H_3PO_4$ | 50 | 1.641 | 1.3 | 80 | 38 | 95 |
| 3 | Same as No. 1 | PEE | 50 | 1.640 | 1.0 | 83 | 32 | 380 |
| 4 (Comparison) | Same as No. 1 | HPE | 50 | 1.639 | 1.1 | 79 | 35 | 207 |
| 5 | Same as No. 1 | CEPP | 50 | 1.645 |  | 81 |  | 261 |
| 6 | 300; $Mn(ac)_2 4H_2O$ 400; $So_2O_3$ | PEE | 50 | 1.638 | 0.7 | 75 | 32 | 365 |
| 7 | 300; $Mn(Ac)_2 4H_2O$ 300; $GeO_2$ | PEE | 50 | 1.639 | 1.3 | 83 | 38 | 253 |

| Example No. | Transesterification or polycondensation catalyst in ppm (based on DMT) | Heat stabilizer | Quantity of heat stabilizer in ppm (based on DMT) | SV | DEG | RG | Pressure build-up test in minutes |
|---|---|---|---|---|---|---|---|
| 8 | 100; $Zn(Ac)_2 \cdot 2H_2O$ 150; $Mn(Ac)_2 \cdot 4H_2O$ 250; $Sb_2O_3$ 100; $GeO_2$ | PEE | 10 | 1.637 |  | 81 | 270 |
| 9 | Same as No. 8 | PEE | 30 | 1.635 |  | 82 | 298 |
| 10 | Same as No. 8 | PEE | 50 | 1.640 |  | 83 | 280 |
| 11 | Same as No. 8 | PEE | 100 | 1.639 |  | 83 | 370 |
| 12 (Comparison) | 150; $Mn(Ac)_2 \cdot 4H_2O$ 100; $Zn(Ac)_2 \cdot 2H_2O$ 250; $Sb_2O_3$ 100; $GeO_2$ | MEPM | 50 | 1.639 | 1.1 | 82 | 209 |
| 13 (Comparison) | Same as No. 12 | MPPM | 50 | 1.643 | 1.3 | 81 | 195 |
| 14 (Comparison) | Same as No. 12 | MBPM | 50 | 1.635 | 1.0 | 82 | 179 |

The pressure build-up test is a measure of the distribution of titanium dioxide and of the transesterification catalysts and hence an indication of the quality of the polymer and processing properties. The test is carried out at 290° C. and consists of measuring the time in minutes required to obtain an increase in pressure of 100 bar (see W. Gey, Kunststoffe 66 (1976), pages 329–335)).

The melt is forced at the rate of 150 g/min. through a specified screen arrangement (one armour plated screen with apertures 17$\mu$ in length; one fine meshed screen having 16,800 mesh/$cm^2$, one medium screen, 2,500 mesh/$cm^2$ and 3 coarse screens, 625 mesh/$cm^2$) and the increase in pressure is recorded.

The solution viscosity (SV) was determined on a 1% solution of the polyester in m-cresol, using a through flow viscometer (Ubbelohde) at 25° C./60% relative humidity.

The degree of remission (RG) is an important characteristic which determines the quality of the polymer, which may be determined by means of an electric remission photometer. The degree of remission is the quantity of light reflected by the sample, expressed as a percentage of the quantity of light reflected from a very white surface (smoked magnesium oxide). The degree of yellowness can be calculated from the average degrees of remission of the samples using filters RI 62, R 46 and R 57, by substituting the values obtained in the following formula:

$$\text{Degree of Yellowness} = \frac{RG_{RI62} - RG_{R46}}{RG_{R57}}$$

The polyesters obtained by the process according to the invention using methane-phosphonic acid derivatives have a low degree of yellowness, within the range of only 0.14 to 0.15, in other words, a high degree of whiteness. In the case of ethane, propane and butane-phosphonic acid derivatives, the degree of yellowness may be more than 0.16.

What we claim is:

1. A linear homopolyester or copolyester of one or more dicarboxylic acids and one or more dihydroxy compounds, which contains a phosphonate corresponding to the following general formula:

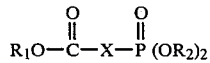

in which $R_1$ and $R_2$, which may be the same or different, represent an alkyl group and X represents $CH_2$ or

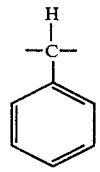

in a quantity corresponding to from 10 to 400 ppm of phosphorus, based on the polyester, in a free and/or chemically bound form.

2. A polyester as claimed in claim 1 in which at least one of $R_1$ and $R_2$ represents an alkyl group having from 1 to 4 carbon atoms.

3. A polyester as claimed in claim 2 characterized in that the quantity of phosphonate corresponds to from 30 to 150 ppm of phosphorus, based on the polyester.

4. A polyester as claimed in claim 3 which contains 2 to 20 carbon atoms in the acid component.

5. A polyester as claimed in claim 3 which contains from 2 to 15 carbon atoms in the dihydroxy component.

6. A fiber comprising the linear homopolyester or copolyester of claim 1.

7. A process for the preparation of a linear homopolyester or copolyester by the reaction of one or more saturated aliphatic, aromatic or cycloaliphatic dicarboxylic acids or their ester forming derivatives with one or more aliphatic, alicyclic, aromatic or araliphatic dihydroxy compounds, followed by polycondensation of the bis-ester in the presence of a polycondensation catalyst and a phosphonate of the general formula:

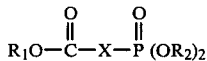

in which $R_1$ and $R_2$, which may be the same or different, represent an alkyl radical and X represents —$CH_2$— or

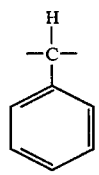

8. A progress as claimed in claim 7 in which, in the general formula of the phosphonate, at least one of $R_1$ and $R_2$ represents an alkyl group having from 1 to 4 carbon atoms.

9. A process as claimed in claim 8 in which the phosphonate is used in a quantity which corresponds to from 10 to 400 ppm of phosphorus based on the polyester.

10. A process as claimed in claim 9 in which the phosphonate is used in a quantity which corresponds to from 30 to 150 ppm of phosphorus, based on the polyester.

11. A polyester prepared by the process of claim 7.

12. The process of claim 7 wherein said first reaction is between one or more of said ester forming derivatives of said dicarboxylic acids in the presence of a transesterification catalyst.

* * * * *